(12) United States Patent
Yamada et al.

(10) Patent No.: US 9,742,623 B2
(45) Date of Patent: Aug. 22, 2017

(54) MASTER DEVICE, COMMUNICATION SYSTEM, AND COMMUNICATION METHOD

(71) Applicant: Panasonic Corporation, Osaka (JP)

(72) Inventors: Hideyuki Yamada, Osaka (JP); Shinichiro Nishioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 449 days.

(21) Appl. No.: 14/466,397

(22) Filed: Aug. 22, 2014

(65) Prior Publication Data

US 2014/0365595 A1    Dec. 11, 2014

Related U.S. Application Data

(63) Continuation of application No. PCT/JP2012/004478, filed on Jul. 11, 2012.

(30) Foreign Application Priority Data

Feb. 27, 2012   (JP) .................................. 2012-039610

(51) Int. Cl.
*H04L 12/24* (2006.01)
*H04L 12/433* (2006.01)
(Continued)

(52) U.S. Cl.
CPC .......... *H04L 41/046* (2013.01); *H04L 12/403* (2013.01); *H04L 12/433* (2013.01); *H04L 47/10* (2013.01)

(58) Field of Classification Search
None
See application file for complete search history.

(56) References Cited

U.S. PATENT DOCUMENTS 5,444,847 A    8/1995 Iitsuka
6,320,871 B1   11/2001 Mizuguchi et al.
(Continued)

FOREIGN PATENT DOCUMENTS

CN    1815449    8/2006
CN    101025700  8/2007
(Continued)

OTHER PUBLICATIONS

First Office Action issued Oct. 19, 2016 in corresponding Chinese Application No. 201280070080.7, with English translation.
(Continued)

*Primary Examiner* — Greg C Bengzon
(74) *Attorney, Agent, or Firm* — Wenderoth, Lind & Ponack, L.L.P.

(57) ABSTRACT

The communication method comprises transmitting a transfer command to transfer the data control, which enables execution of controlling data stored in one or more communication devices connected to at least one of the first and second master devices, from the first master device to the second master device through a first communication line, transmitting a response to the transfer command from the second master device to the first master device through the first communication line, and transmitting a confirmation notification for the response from the first master device to the second master device through the first communication line. The execution of controlling data in the first master device is stopped when the first master device has transmitted the confirmation notification, and the execution of controlling data in the second master device is enabled when the second master device has received the confirmation notification.

7 Claims, 11 Drawing Sheets

(51) Int. Cl.
*H04L 12/801* (2013.01)
*H04L 12/403* (2006.01)

(56) References Cited

U.S. PATENT DOCUMENTS

| | | | |
|---|---|---|---|
| 6,750,917 B2 | 6/2004 | Yamada et al. | |
| 7,483,370 B1 * | 1/2009 | Dayal | G06F 11/2038 370/219 |
| 7,593,320 B1 * | 9/2009 | Cohen | H04L 41/0663 370/217 |
| 8,041,798 B1 * | 10/2011 | Pabla | G06F 9/5072 709/201 |
| 8,856,580 B2 * | 10/2014 | Mongeau | H04L 69/40 714/2 |
| 8,885,524 B2 * | 11/2014 | Liu | H04L 41/30 370/278 |
| 9,065,768 B2 * | 6/2015 | Luo | H04L 45/42 |
| 9,325,618 B1 * | 4/2016 | Yonge, III | H04L 47/10 |
| 9,350,626 B2 * | 5/2016 | Nakamura | H04L 12/2602 |
| 2001/0038422 A1 | 11/2001 | Yamada et al. | |
| 2002/0055978 A1 * | 5/2002 | Joon-Bo | H04W 84/20 709/209 |
| 2003/0061389 A1 * | 3/2003 | Mazza | H04L 12/433 709/248 |
| 2003/0140109 A1 * | 7/2003 | Pospesel | H04L 12/433 709/208 |
| 2003/0214953 A1 * | 11/2003 | El-Demerdash | H04L 12/403 370/400 |
| 2005/0125501 A1 * | 6/2005 | Inomoto | H04L 12/42 709/208 |
| 2005/0207440 A1 * | 9/2005 | Tyan | H04J 14/0227 370/454 |
| 2005/0220127 A1 * | 10/2005 | Cane | G05B 19/0421 370/410 |
| 2005/0232145 A1 * | 10/2005 | Tanju | G05B 9/03 370/217 |
| 2006/0117089 A1 * | 6/2006 | Karam | H04L 1/22 709/208 |
| 2006/0198386 A1 * | 9/2006 | Liu | H04L 67/32 370/419 |
| 2006/0248017 A1 * | 11/2006 | Koka | G06F 21/105 705/59 |
| 2006/0282506 A1 * | 12/2006 | Furuishi | G05B 19/052 709/208 |
| 2007/0040657 A1 * | 2/2007 | Fosler | H02J 1/08 340/333 |
| 2007/0053375 A1 * | 3/2007 | Kurosawa | H04L 12/417 370/450 |
| 2007/0156857 A1 * | 7/2007 | King | H04L 41/0806 709/220 |
| 2009/0041015 A1 * | 2/2009 | Zhang | H04L 45/00 370/392 |
| 2009/0055909 A1 * | 2/2009 | Cheng | H04W 74/02 726/6 |
| 2009/0097419 A1 * | 4/2009 | Nakamura | H04L 12/5692 370/258 |
| 2009/0248932 A1 * | 10/2009 | Taylor | G06F 13/24 710/110 |
| 2010/0135310 A1 * | 6/2010 | Carter | H04L 12/417 370/402 |
| 2010/0195489 A1 * | 8/2010 | Zhou | H04L 12/433 370/216 |
| 2010/0226260 A1 * | 9/2010 | Zinjuvadia | H04L 41/12 370/248 |
| 2011/0022885 A1 * | 1/2011 | Holappa | H04L 29/12094 714/4.12 |
| 2011/0026411 A1 * | 2/2011 | Hao | H04L 12/40189 370/249 |
| 2011/0029687 A1 * | 2/2011 | Kirrmann | H04L 12/437 709/236 |
| 2011/0093559 A1 * | 4/2011 | Yabusaki | H04L 12/403 709/208 |
| 2011/0161538 A1 * | 6/2011 | Decker | G06F 11/2005 710/110 |
| 2011/0176560 A1 * | 7/2011 | Mori | H04L 12/417 370/498 |
| 2011/0222395 A1 * | 9/2011 | Ham | H04L 12/40013 370/217 |
| 2011/0238773 A1 * | 9/2011 | Nakamura | H04L 12/403 709/208 |
| 2011/0255549 A1 * | 10/2011 | Nakamura | H04L 12/403 370/401 |
| 2011/0292837 A1 * | 12/2011 | Nakamura | H04L 12/2602 370/256 |
| 2012/0106387 A1 * | 5/2012 | Nakamura | H04L 12/4035 370/252 |
| 2012/0163239 A1 * | 6/2012 | Okabe | H04L 41/12 370/258 |
| 2012/0185592 A1 * | 7/2012 | Nakamura | H04L 12/2602 709/224 |
| 2013/0064544 A1 * | 3/2013 | Raponi | H04L 12/433 398/58 |
| 2013/0094352 A1 * | 4/2013 | Bouhal | H04L 12/40176 370/225 |
| 2013/0138757 A1 * | 5/2013 | Ferron | H04L 12/2807 709/208 |
| 2013/0219004 A1 * | 8/2013 | Mace | G06F 15/7842 709/208 |

FOREIGN PATENT DOCUMENTS

| | | |
|---|---|---|
| CN | 102265562 | 11/2011 |
| JP | 9-149061 | 6/1997 |
| JP | 2000-101617 | 4/2000 |
| JP | 2001-4478 | 1/2001 |
| JP | 2001-57566 | 2/2001 |
| JP | 2001-245225 | 9/2001 |

OTHER PUBLICATIONS

International Search Report issued Oct. 9, 2012 in International (PCT) Application No. PCT/JP2012/004478.

* cited by examiner

MASTER DEVICE, COMMUNICATION SYSTEM, AND COMMUNICATION METHOD

PRIORITY

This is a continuation application under 35 U.S.C. §120 and 35 U.S.C. §365 of International Application PCT/JP2012/004478, with an international filing date of Jul. 11, 2012 which claims priority to Japanese Patent Application No. 2012-039610 filed on Feb. 27, 2012. The entire disclosures of International Application PCT/JP2012/004478 and Japanese Patent Application No. 2012-039610 are hereby incorporated herein by reference.

BACKGROUND

Technical Field

The present disclosure relates to technology for sending and receiving a data control, which is the right to control data in a network, between communication devices.

Background Art

The use of a so-called data transmission control in a ring network consisting of a plurality of communication devices connected by a communication line has been known in the past. A data transmission control is the right of a communication device to transmit data or the like to a communication line, and is sometimes also called a token. With a network such as this, only the communication device that has acquired a data transmission control can transmit data.

For example, Japanese Laid-Open Patent Application 2000-101617 discusses technology for performing communication control in a network in which a single master node and a plurality of slave nodes are connected in a loop, and the master node issues a token to the slave nodes.

SUMMARY

Technical Problem

With the conventional ring network disclosed in Japanese Laid-Open Patent Application 2000-101617, the communication device receives a data transmission control (token) by transmitting and receiving specific data (packets, etc.) on a communication line for transmitting and receiving data.

Therefore, if the communication line is for some reason unable to perform communication properly, the data transmission control will not be transmitted or received properly between the communication devices. If this happens, it is conceivable that there will be a plurality of data transmission controls on a single network, or that there will be no data transmission control at all. In a situation such as this, there is the possibility that proper communication will be lost on the network.

In view of this, the present disclosure provides a master device, a communication system, and a communication method with which data control on a network can be transmitted and received more reliably.

Solution to Problem

The master device disclosed herein is configured to be connected to a first communication device and one or more second communication devices, and comprises a transceiver and a controller. The transceiver is configured to transmit to the first communication device, via a first communication line, a transfer command to transfer a data control, and receive a response to the transfer command from the first communication device. The data control enables execution of controlling data stored in at least the one or more second communication devices. The controller is configured to produce the transfer command and either stop or enable the execution of controlling the data in the master device. The controller is configured to produce a confirmation notification for the response, and stop the execution of controlling the data in the master device when having transmitted the confirmation notification to the first communication device through the transceiver.

The second master device disclosed herein is configured to be connected to at least one communication device and a first master device. The at least one communication device is configured to store data. The first master device is configured to manage a data control that enables execution of controlling at least the data. The second master device comprises a transceiver and a controller. The transceiver is configured to receive a transfer command to transfer the data control from the first master device via a first communication line, and transmits to the first master device a response to this transfer command. The controller is configured to produce the response to the transfer command and either stop or enable the execution of controlling the data in the second master device. The controller is further configured to enable the execution of controlling the data in the second master device when having received a confirmation notification for the response from the first master device via the transceiver.

The communication system disclosed herein comprises one or more communication devices configured to store data, a first master device, and a second master data. The first master device is connected to the one or more communication devices and configured to manage a data control that enables execution of controlling the data. The second master device is connected to the first master device and the one or more communication devices. The first master device includes a first transceiver and a first controller. The first transceiver is configured to transmit through a first communication line to the second master device a transfer command to transfer the data control, and receive from the second master device a response to the transfer command. The first controller is configured to produce the transfer command and stop or enable the execution of controlling the data in the first master device. The second master device includes a second transceiver and a second controller. The second transceiver is configured to receive the transfer command from the first master device through the first communication line, and transmit the response to the transfer command to the first master device. The second controller is configured to produce the response and stop or enable the execution of controlling the data in the second master device. The first controller is further configured to produce a confirmation notification for the response, and stop the execution of controlling the data in the first master device when having transmitted the confirmation notification through the first transceiver to the second master device. The second controller is further configured to enable the execution of controlling the data in the second master device when having received the confirmation notification for the response from the first master device through the second transceiver.

The communication method disclosed herein makes use of one or more communication devices, a first master device, and a second master device. The first master device is configured to manage a data control that enables execution of controlling data stored at least in the one or more communication devices. The second master device is connected to the first master device and the one or more communication devices. This method includes the following processing: (i) transmitting a transfer command to transfer the data control from the first master device to the second master device through a first communication line; (ii) transmitting a response to the transfer command from the second master device to the first master device through the first communication line; (iii) transmitting a confirmation notification for the response from the first master device to the second master device through the first communication line; (iv) stopping the execution of controlling the data in the first master device when the first master device has transmitted the confirmation notification; and (v) enabling the execution of controlling the data in the second master device when the second master device has received the confirmation notification.

The master device, communication system, and communication method disclosed herein afford more reliable transmission and reception of the data control between communication devices.

DETAILED DESCRIPTION

Embodiments will now be described in detail through reference to the drawings as needed. However, unnecessarily detailed description may be omitted. For example, redundant description of components that are substantially the same, or detailed description of things that are already well known may be omitted. This is to avoid unnecessary repetition in the following description, and facilitate an understanding on the part of a person skilled in the art.

The inventors have provided the appended drawings and the following description so that a person skilled in the art might fully understand this disclosure, but do not intend for these to limit what is discussed in the claims.

Embodiment 1

1-1. Configuration

Figure 1:
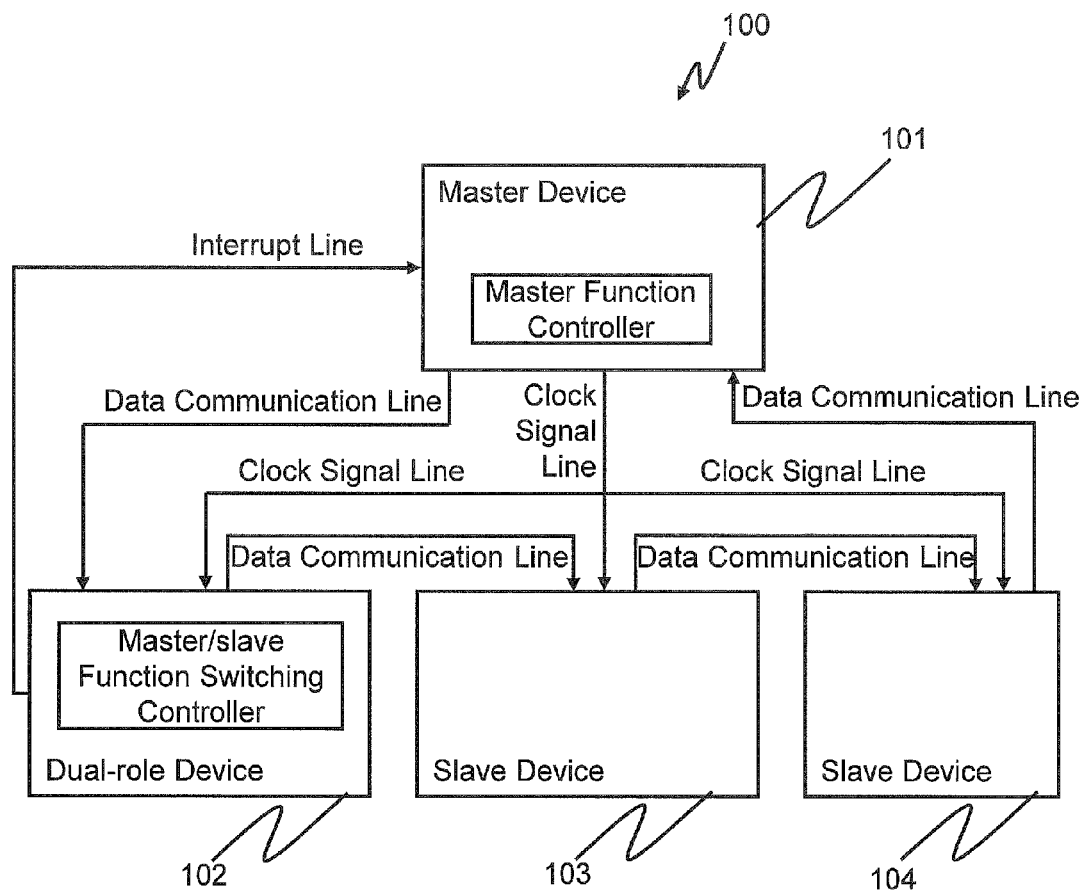
FIG. 1 is a simplified diagram of the communication system configuration in Embodiment 1.

FIG. 1 is a simplified diagram of the configuration of a communication system 100 pertaining to this embodiment. The communication system 100 is, for example, a system formed in a digital camera, a smart phone, or any other such electronic device. The communication system 100 comprises a master device 101 (an example of a master device), a dual-role device 102 (an example of a first communication device or a second master device), a slave device 103 (an example of a second communication device or a communication device), and a slave device 104 (an example of a second communication device or a communication device). In some of the following description, each of the master device 101, the dual-role device 102, and the slave device 103 will be called a "communication device."

The communication devices are connected via communication lines (data lines; an example of a first communication line), respectively. The communication devices are connected by data input communication lines and data output communication lines. Each of these communication lines connects to a different communication device. As shown in FIG. 1, one of two adjacent communication devices is connected to the communication line on the input side, and the other one is connected to the communication line on the output side, which results in an overall configuration in the form of a ring network connection (ring topology).

The master device 101 controls data in a ring topology network. The control of data includes, for example, issuing commands to other communication devices as the master (the dominant device), commanding the reading and writing of data, and transmitting and receiving data. The master device 101 also manages a data control in any of the communication devices in the communication system 100. The data control enables execution of a function of exclusively controlling data stored in a connected communication device. Examples of the master device 101 include a main control device (CPU, memory, etc.) in an electronic device such as a digital camera or a smart phone.

The dual-role device 102 is a device capable of acquiring a data control from the master device 101. If the dual-role device 102 has not acquired a data control, it operates as a slave device. Once the dual-role device 102 acquires a data control, the dual-role device 102 can perform the control of data, such as actively transmitting data to the network, or issuing commands related to data. The dual-role device 102 switches between these two roles under the control of the master device 101. An example of the dual-role device 102 is a wireless apparatus in an electronic device.

The slave devices 103 and 104 are devices that do not have the function of actively transmitting data to the network. A specific application example of the slave device 103 is a recording device such as a memory device used in an electronic device. This corresponds to a device that stores data. The number of slave devices is not limited to what is shown in the drawings, and may instead be just one, or may be two or more.

The master device 101 and the dual-role device 102 are directly connected by an interrupt line (an example of a second communication line). The master device 101 supplies clock signals to the dual-role device 102 and the slave devices 103 and 104.

Figure 2:
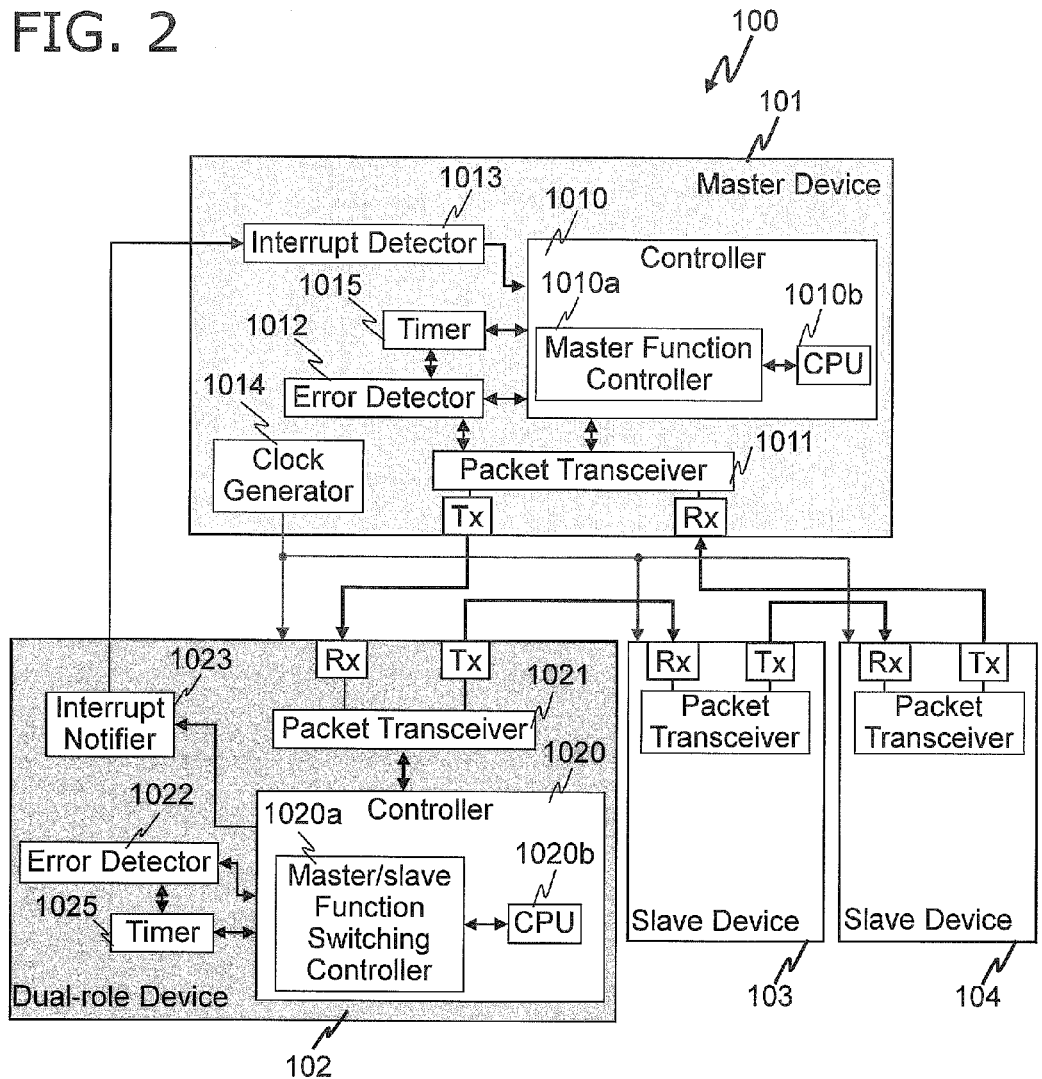
FIG. 2 is a simplified diagram of the functional configuration of the communication system in Embodiment 1.

FIG. 2 is a diagram of the functional configuration of the master device 101, the dual-role device 102, the slave device 103, and the slave device 104. In the following description, the above-mentioned data control will be called a master right.

1-1-1. Configuration of Master Device 101

The master device 101 includes a controller 1010 (an example of a controller or a first controller), a packet transceiver 1011 (an example of a transceiver or a first transceiver), an error detector 1012, an interrupt detector 1013 (an example of a detector), a clock generator 1014, and a timer 1015.

The controller 1010 controls the entire master device 101, such as controlling packet transmission, execution during packet reception, and management of the system status during error detection and interrupt detection.

The packet transceiver 1011 performs identification of received packets and packet transmission according to commands from the controller 1010.

The error detector 1012 detects an error during packet reception (a time-out or an improper packet reception), and notifies the controller 1010.

The interrupt detector 1013 monitors the interrupt line, and notifies the controller 1010 if an interrupt from the dual-role device 102 is detected.

The clock generator 1014 generates an operating clock for the communication system 100, and outputs it to the dual-role device 102 and the slave devices 103 and 104.

The timer 1015 manages time on the basis of the number of internal clock pulses, etc.

The controller 1010 includes a master function controller 1010*a* and a CPU 1010*b*. The master function controller 1010*a* controls the stopping and restarting of the master functions of the master device 101 (the function of issuing commands to the dual-role device 102 and the slave devices 103 and 104).

1-1-2. Configuration of Dual-Role Device 102

Next, the functional configuration of the dual-role device 102 will be described through reference to FIG. 2. The dual-role device 102 includes a controller 1020 (an example of a controller or a second controller), a packet transceiver 1021 (an example of a transceiver or a second transceiver), an error detector 1022, an interrupt notifier 1023 (an example of a detector), and a timer 1025.

The controller 1020 controls the entire dual-role device 102, such as controlling packet transmission, execution during packet reception, and management of the system status during error detection and interrupt notification.

The packet transceiver 1021 performs identification of received packets and packet transmission according to commands from the controller 1020.

The error detector 1022 detects an error during packet reception (a time-out or an improper packet reception), and notifies the controller 1020.

The interrupt notifier 1023 drives the interrupt line according to commands from the controller 1020.

The timer 1025 manages time on the basis of the number of internal clock pulses, etc.

The controller 1020 includes a master/slave function switching controller 1020*a* and a CPU 1020*b*. The master/slave function switching controller 1020*a* controls switching between the master state and slave state of the dual-role device 102, and the execution of the master function (the function of issuing commands to the slave device 103) in the master state.

1-2. Operation

The operation of the communication system 100 in this embodiment and configured as above will now be described.

1-2-1. Transfer of Master Right

Figure 3:
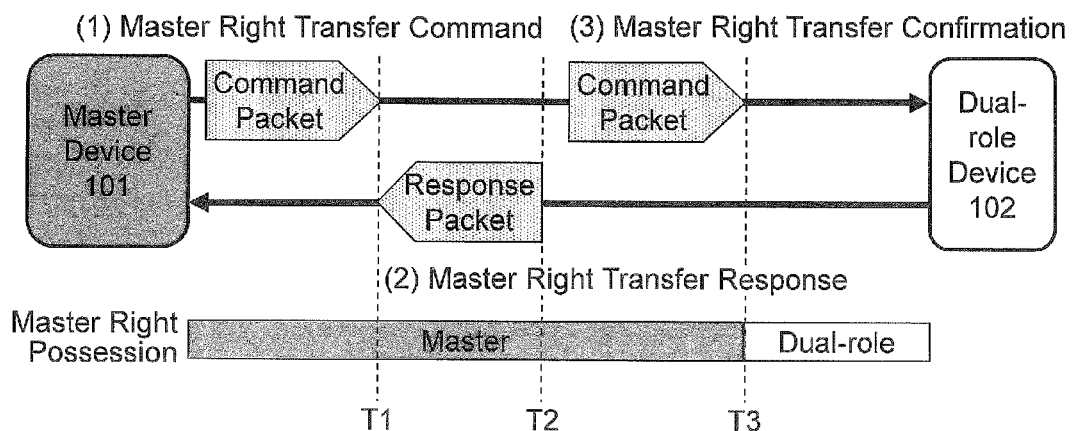
FIG. 3 is a diagram of a packet data transmission and reception sequence when a data control is transferred from a master device to a dual-role device in Embodiment 1.
Figure 4:
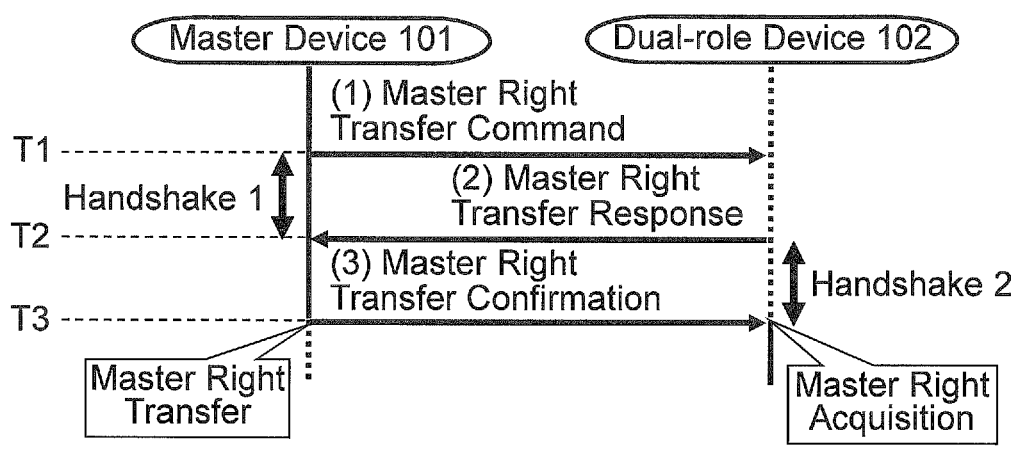
FIG. 4 is a processing sequence diagram of when a data control is transferred from a master device to a dual-role device in Embodiment 1.

FIG. 3 shows the sequence of transmitting and receiving packet data during master right transfer, which is performed between the master device 101 and the dual-role device 102. FIG. 4 shows the sequence of processing for transferring the master right from the master device 101 to the dual-role device 102.

As shown in FIGS. 3 and 4, during transfer of the master right, (1) the master device 101 sends a master right transfer command (an example of a transfer command) to the dual-role device 102 at T1 shown in FIG. 3.

(2) Then, the dual-role device 102 sends the master device 101*a* master right transfer response (an example of a response) in response to the master right transfer command at T2 shown in FIG. 3. A handshake 1 is established when the master device 101 receives the master right transfer response.

(3) When the handshake 1 is established, the master device 101 sends a master right transfer confirmation (an example of a confirmation notification) to the dual-role device 102 at T3 shown in FIG. 3. The master device 101 at this point determines that the master right transfer is complete, and stops its master function, that is, stops such functions as transmitting data or issuing commands to other communication devices. When the dual-role device 102 receives a master right transfer confirmation, a handshake 2 is established. The dual-role device 102 at this point determines that the master right acquisition is complete, and actuates its master function.

Thus, the transfer of the master right from the master device 101 to the dual-role device 102 is completed by handshake in the three steps T1, T2, and T3.

Master Right Transfer by Master Device 101

Figure 5:
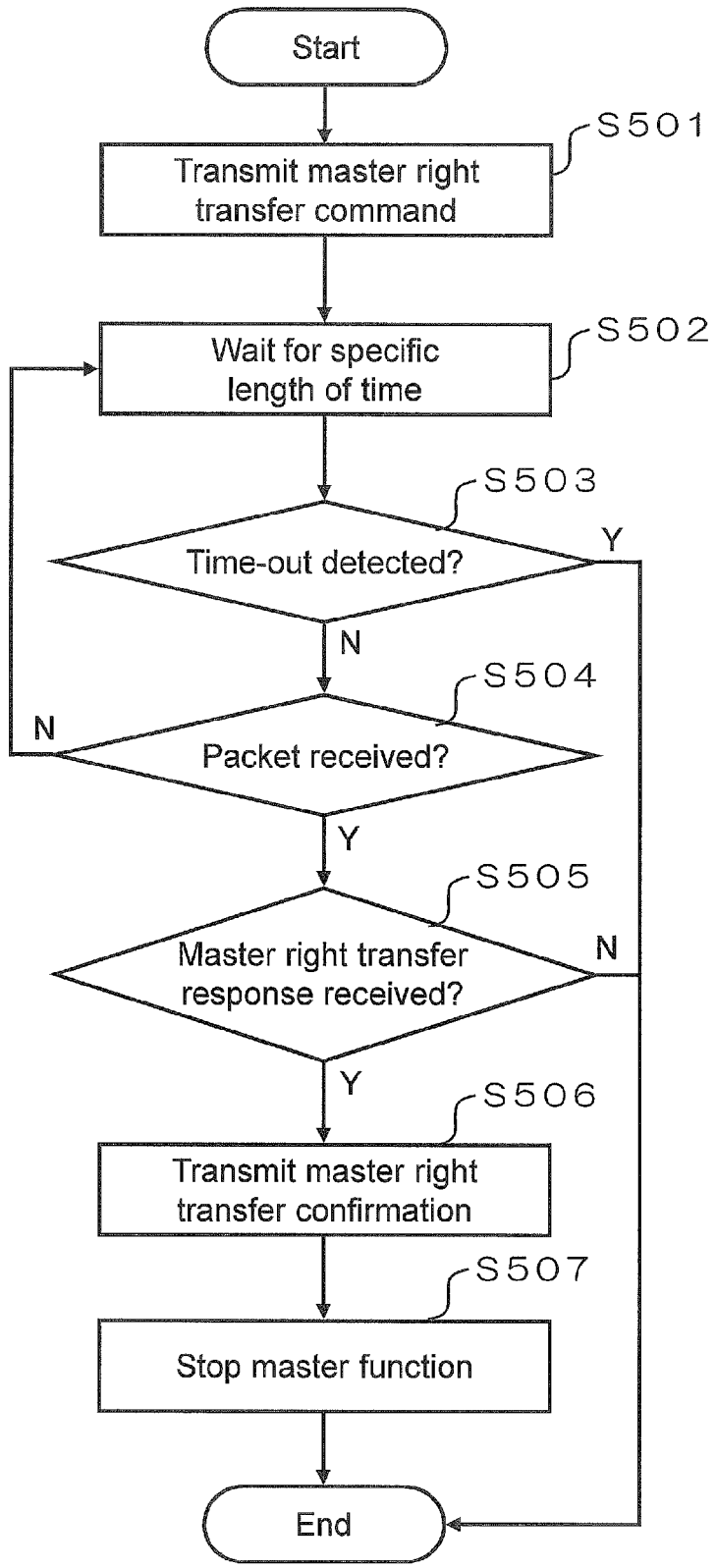
FIG. 5 is a flowchart of the processing performed by the master device when the data control is transferred in Embodiment 1.

Next, the processing performed by the master device 101 in the master right transfer sequence will be described through reference to the configuration diagram in FIG. 2 and the flowchart in FIG. 5.

Step S501: At the start of the master right transfer sequence, the master function controller 1010*a* of the controller 1010 orders the packet transceiver 1011 to send a master right transfer command to the dual-role device 102.

Step S502: When the master right transfer command is sent to the dual-role device 102, the master function controller 1010*a* enters processing to wait for the reception of a master right transfer response from the dual-role device 102, and waits for a specific length of time.

Step S503: After this specific length of time has elapsed, the master function controller 1010*a* checks whether or not there has been a handshake time-out notification from the error detector 1012. The error detector 1012 detects a time-out according to the count produced by the timer 1015, and notifies the master function controller 1010a of the detection result. If a time-out has occurred, the processing is ended.

Step S504: The master function controller 1010a continues to check whether or not a packet has been received from the packet transceiver 1011, as long as no time-out has occurred. The master function controller 1010a at this point returns to step S502 if no packet has been received.

Step S505: The master function controller 1010a checks the type of packet if a packet has been received. Here, the processing is ended if the received packet is not a master right transfer response.

Step S506: If the received packet is a master right transfer response, the master function controller 1010a orders the packet transceiver 1011 to send a master right transfer confirmation to the dual-role device 102.

Step S507: When a master right transfer confirmation has been sent, the master function controller 1010a stops its master function.

Thereafter, the master device 101 does not issue commands to the other communication devices 102, 103, and 104 until its master function is resumed.

Master Right Transfer by Dual-Role Device 102

Figure 6:
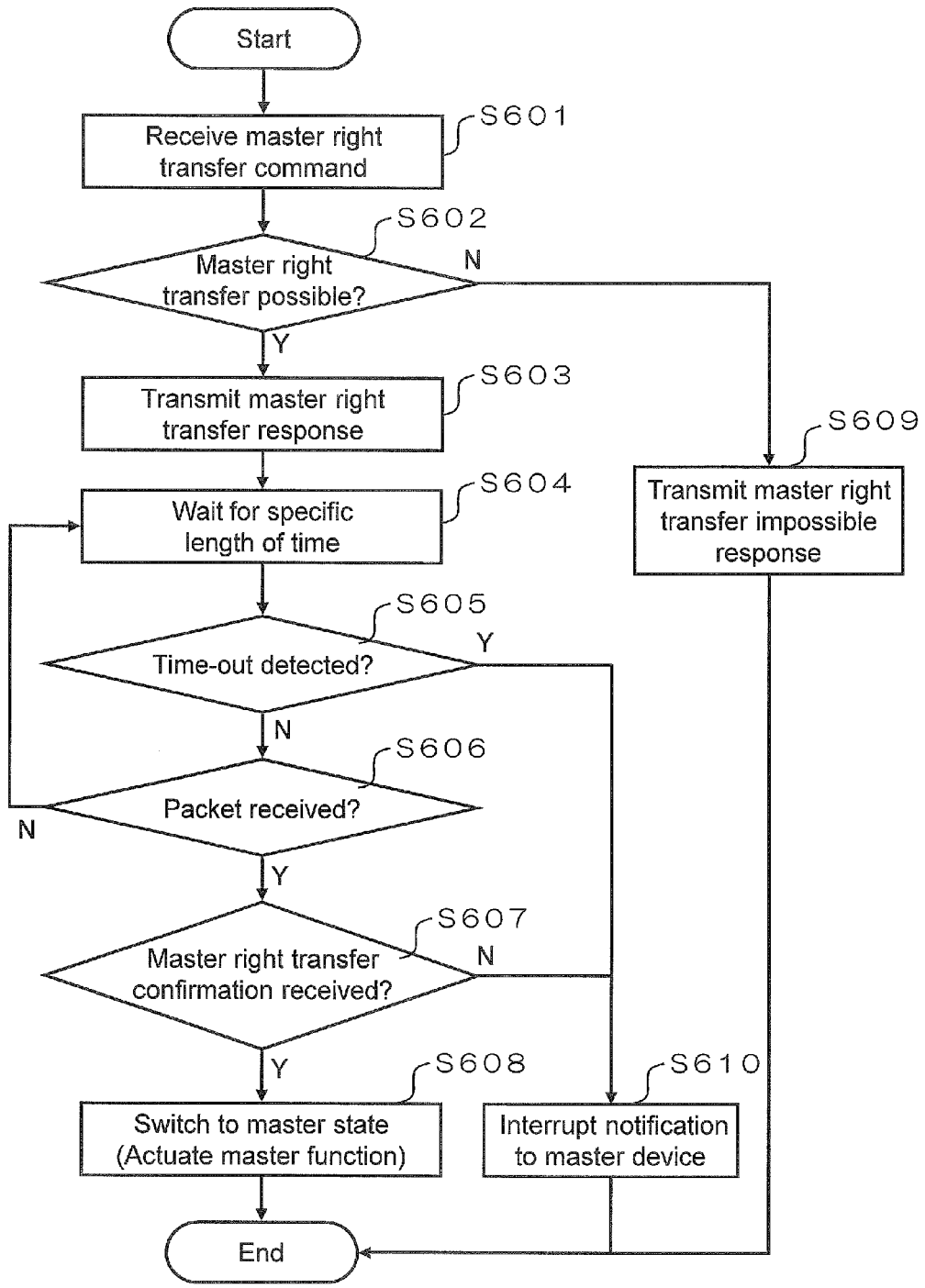
FIG. 6 is a flowchart of the processing performed by the dual-role device when the data control is transferred in Embodiment 1.

Next, the processing performed by the dual-role device 102 in the master right transfer sequence will be described through reference to the configuration diagram in FIG. 2 and the flowchart in FIG. 6.

Step S601: First, the packet transceiver 1021 notifies the controller 1020 when a master right transfer command is received from the master device 101.

Step S602: The master/slave function switching controller 1020a of the controller 1020 then checks whether or not it is capable of transfer to a master state. If transfer to a master state is impossible, the processing proceeds to step S609.

Step S603: The master/slave function switching controller 1020a sends a command to the packet transceiver 1021 if transfer to a master state is possible, and sends a master right transfer response to the master device 101.

Step S604: When a master right transfer response is sent, the master/slave function switching controller 1020a enters processing to wait for the reception of a master right transfer confirmation from the master device 101, and waits for a specific length of time.

Step S605: After this specific length of time has elapsed, the master/slave function switching controller 1020a checks whether or not there has been a handshake time-out notification from the error detector 1022. The error detector 1022 detects a time-out according to the count produced by the timer 1025, and notifies the master/slave function switching controller 1020a of the detection result.

Step S606: The master/slave function switching controller 1020a continues to check whether or not a packet has been received from the packet transceiver 1021, as long as no time-out has occurred.

The master/slave function switching controller 1020a at this point returns to step S604 if no packet has been received.

Step S607: The master/slave function switching controller 1020a checks the type of packet if a packet has been received.

Step S608: If the received packet is a master right transfer confirmation, the master/slave function switching controller 1020a switches its state to the master state, and commences the master function. Thereafter, the dual-role device 102 is able to issue commands to the slave devices 103 and 104.

Step S609: On the other hand, if transfer to the master state in step S602 is impossible, the master/slave function switching controller 1020a sends a master right transfer impossible response to the master device 101 through the packet transceiver 1021, and ends processing.

Step S610: If a time-out has occurred in step S605, or if the received packet in step S607 is a packet other than a master right transfer confirmation, then the master/slave function switching controller 1020a sends an interrupt request (an example of a specific notification) to the interrupt notifier 1023, notifies the master device 101 of an interrupt, and ends processing.

1-2-2. Master Right Return Processing

Figure 7:
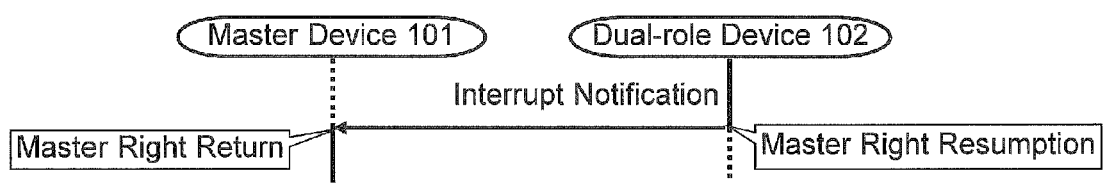
FIG. 7 is a processing sequence diagram of when the data control is returned from the dual-role device to the master device in Embodiment 1.

FIG. 7 shows the sequence for returning the master right from the dual-role device 102 to the master device 101.

For return of master right, the dual-role device 102 uses the interrupt line to notify the master device 101 of an interrupt. The dual-role device 102 also transfers to a slave state during interrupt notification, and stops its master function. When receiving the interrupt notification from the dual-role device 102, the master device 101 determines that the master right has been returned, and resumes its master function.

Thus, the interrupt notification serves as a trigger to return the master right from the dual-role device 102 to the master device 101.

Master Right Return Processing Performed by Master Device 101

Figure 8:
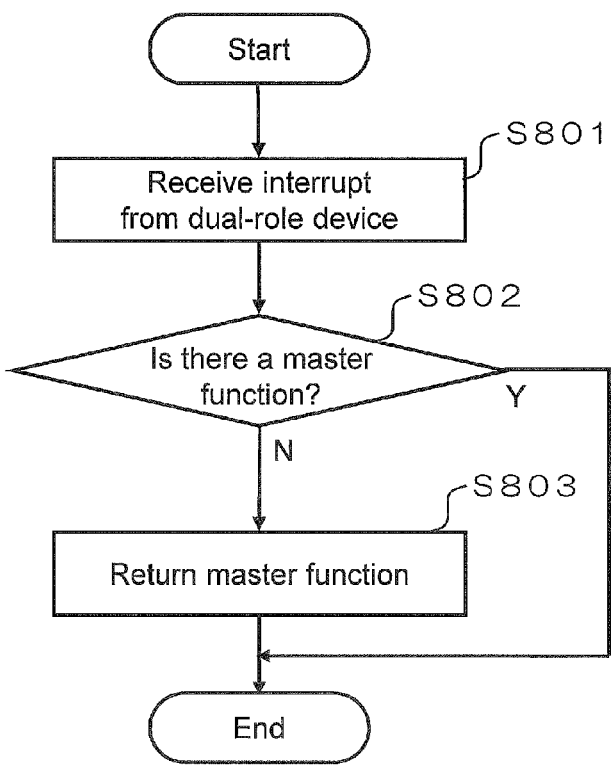
FIG. 8 is a flowchart of the processing performed by the master device when the data control is returned in Embodiment 1.

The processing performed by the master device 101 in the master right return sequence will be described through reference to the configuration diagram in FIG. 2 and the flowchart in FIG. 8.

Step S801: For return of master right, the interrupt detector 1013 receives an interrupt notification from the dual-role device 102, and notifies the controller 1010.

Step S802: The master function controller 1010a of the controller 1010 checks whether or not it has the master function itself. If it does not have the master function, the flow proceeds to step S803, and if it does have the master function, the processing is ended.

Step S803: The master function controller 1010a determines that the master right has been returned by the dual-role device 102, and resumes its master function. Subsequently, the master device 101 is able to issue commands to the other communication devices 102, 103, and 104.

Master Right Return Processing Performed by Dual-Role Device 102

Figure 9:
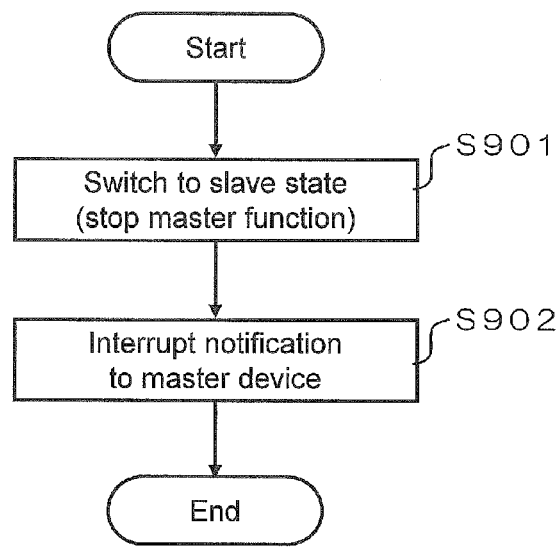
FIG. 9 is a flowchart of the processing performed by the dual-role device for return of the data control in Embodiment 1.

The processing performed by the dual-role device 102 in the master right return sequence will be described through reference to the configuration diagram in FIG. 2 and the flowchart in FIG. 9.

Step S901: For return of master right, the master/slave function switching controller 1020a switches its own state to a slave state, and stops its master function.

Step S902: The master/slave function switching controller 1020a then sends a command to the interrupt notifier 1023, and notifies the master device 101 of an interrupt. Subsequently, the dual-role device 102 does not issue any commands to the slave devices.

The interrupt notification performed by the dual-role device 102 is received (i) in a case where the master right is returned from the dual-role device 102 and (ii) in a case where an error has occurred in communication between the master device 101 and the dual-role device 102. A communication error (ii) can occur, for example, when a time-out is detected after transmission of a master right transfer response by the dual-role device 102 (step S605 in FIG. 6), or when a master right transfer confirmation could not be received from the master device 101 (step S607 in FIG. 6).

Processing when Master Right Transfer Response has Disappeared

Figure 10:
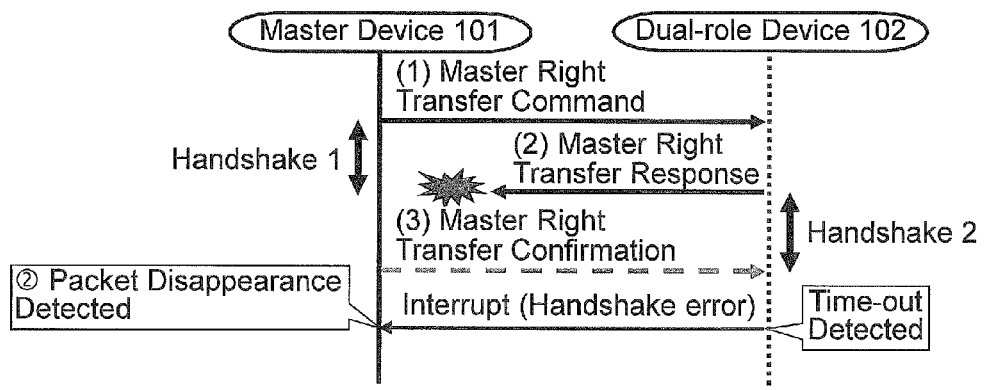
FIG. 10 is a sequence diagram between the master device and the dual-role device when the master right transfer response has disappeared in Embodiment 1.

As shown in FIG. 10, neither the handshake 1 nor the handshake 2 is established when the master right transfer response from the dual-role device 102 to the master device 101 has disappeared. In this case, the master right is not transferred to the dual-role device 102.

The processing performed by the master device 101 when the master right transfer response has thus disappeared will now be described, again through reference to the configuration diagram in FIG. 2 and the flowchart in FIG. 5.

After the master device 101 has transmitted a master right transfer command (step S501), the master device 101 enters processing to wait for the reception of a master right transfer response from the dual-role device 102 (step S502). At this point, if the master right transfer response disappears during transmission as shown in FIG. 10, the error detector 1012 of the master device 101 detects a time-out in waiting for the master right transfer response (step S503), and the master function controller 1010a of the controller 1010 ends the master right transfer processing. The master device 101 still possess the master right at this point.

Meanwhile, the processing performed by the dual-role device 102 when the master right transfer response from the dual-role device 102 has disappeared will now be described, again through reference to the configuration diagram in FIG. 2 and the flowchart in FIG. 6.

When the master right transfer response disappears, the error detector 1022 detects a time-out (step S605) with respect to the master/slave function switching controller 1020a, which is in a state of waiting for receipt of a master right transfer confirmation from the master device 101 (steps S604 to S606). Upon learning that the error detector 1022 has detected a time-out, the master/slave function switching controller 1020a orders the interrupt notifier 1023 to notify the master device 101 of an interrupt, and ends the master right transfer processing (step S610). At this point, the master right is not transferred to the dual-role device 102, which avoids conflict of the master right. Also, the master device 101 can detect the disappearance of the master right transfer response by notification of an interrupt from the dual-role device 102.

1-2-4. Processing when Master Right Transfer Confirmation has Disappeared

Figure 11:
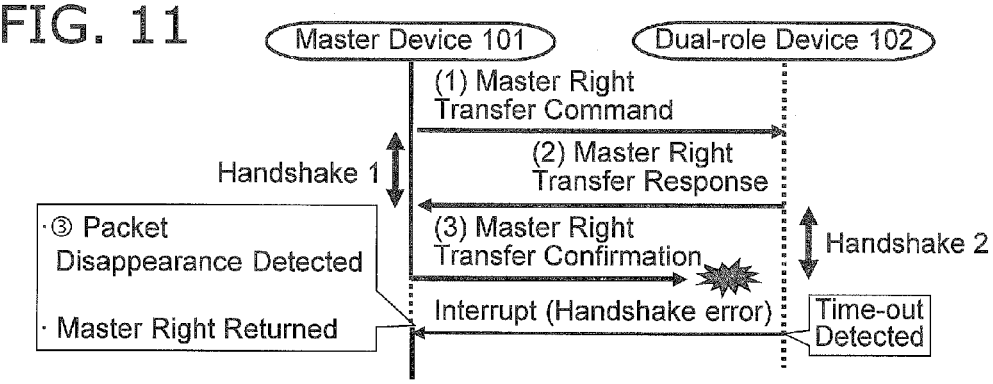
FIG. 11 is a sequence diagram between the master device and the dual-role device when the master right transfer confirmation has disappeared in Embodiment 1.

As shown in FIG. 11, the handshake 2 is not established when the master right transfer confirmation from the master device 101 to the dual-role device 102 has disappeared. In this case, the master right is not transferred to the dual-role device 102.

The processing performed by the master device 101 when the master right transfer confirmation has thus disappeared will now be described, again through reference to the configuration diagram in FIG. 2 and the flowcharts in FIGS. 5 and 8.

The master function controller 1010a stops the master function (step S507) after the master right transfer confirmation has been sent to the dual-role device 102 (step S506). After this, if the master right transfer confirmation disappears during transmission as shown in FIG. 11, the interrupt detector 1013 detects an interrupt notification from the dual-role device 102. The master function controller 1010a determines that the master right has been returned based on receipt of this interrupt notification, and resumes its master function (steps S801 to S803).

Meanwhile, the processing performed by the dual-role device 102 when the master right transfer confirmation from the master device 101 has disappeared will now be described, again through reference to the configuration diagram in FIG. 2 and the flowchart in FIG. 6.

When the master right transfer confirmation disappears, the error detector 1022 detects a time-out (step S605) with respect to the master/slave function switching controller 1020a, which is in a state of waiting for receipt of a master right transfer confirmation from the master device 101 (steps S604 to S606). Upon learning that the error detector 1022 has detected a time-out, the master/slave function switching controller 1020a orders the interrupt notifier 1023 to notify the master device 101 of an interrupt, and ends the master right transfer processing (step S610). At this point, the master right is not transferred to the dual-role device 102, which avoids conflict of the master right. Also, as discussed above, the master device 101 determines that the master right has been returned based on receipt of an interrupt notification from the dual-role device 102, and resumes its master function (steps S801 to S803).

1-3. Modification Example

If the master function controller 1010a of the master device 101 receives a packet other than a master right transfer response in the processing (step S505) to wait for the receipt of a master right transfer response from the dual-role device 102, the packet reception may be invalidated. In this case, the process returns to step S502, and then, the processing to wait for the receipt of a master right transfer response is continued.

Also, if the master/slave function switching controller 1020a of the dual-role device 102 receives a packet other than a master right transfer confirmation in the processing (step S607) to wait for the receipt of a master right transfer confirmation from the master device 101, the packet reception may be invalidated. In this case, the process returns to step S604, and then, the processing to wait for the receipt of a master right transfer confirmation is continued.

1-4. Effects, Etc.

As discussed above, in this embodiment, the master device 101 comprises the packet transceiver 1011 and the controller 1010. The packet transceiver 1011 is connected to the dual-role device 102 and the slave device 103, transmits a master right transfer command through a communication line to the dual-role device 102, and receives a master right transfer response in response to the transfer command from the dual-role device 102. The master right transfer command enables execution of a function of controlling data stored in the slave device 103. The controller 1010 produces the master right transfer command and stops or enables execution of the master function in the master device 101. The controller 1010 generates a master right transfer confirmation notification in response to the master right transfer response, and stops the master function in the master device 101 when the confirmation notification has been sent through the packet transceiver 1011 to the dual-role device 102.

Also, in this embodiment, the dual-role device 102 comprises has the packet transceiver 2011 and the controller 2010. The packet transceiver 2011 is connected to the slave device 103 that stores data and the master device 101 that manages the master right. The packet transceiver 2011 receives a master right transfer command through a communication line from the master device 101, and transmits to the master device 101a master right transfer in response to the transfer command. The controller 2010 produces the master right transfer response and stops or enables execution of the master function in the dual-role device 102. The controller 2010 enables execution of the master function in the dual-role device 102 when the master right transfer confirmation notification in response to the master right transfer response has been received from the master device 101 through the transceiver 2011.

Consequently, the transfer of the master right from the master device 101 to the dual-role device 102 is completed using a three-step handshake, so the transmission and reception of the master right between communication devices can be performed more reliably. In particular, an abnormal state in which no communication device has the master right, or a state in which a plurality of communication devices have the master right (conflict of the master right) can be avoided during master right transfer processing.

The "conflict of the master right" referred to here is a state in which the master device 101 and the dual-role device 102 both recognize having the master right. When there is conflict of the master right, where the master device 101, the dual-role device 102 and the slave devices 103 and 104 are connected in a ring, commands such as to write data to the slave devices 103 and 104 will be issued by both the master device 101 and the dual-role device 102. As a result, there is the risk that processing such as data writing to the slave devices 103 and 104 will not be properly executed. This risk is avoided in the above embodiment.

Also, in this embodiment, the master device 101 further includes the interrupt detector 1013 that detects the receipt of an interrupt notification via an interrupt line that is different from the above-mentioned communication line and connected to the dual-role device 102. When this interrupt detector 1013 detects the receipt of an interrupt notification, the controller 1010 determines whether or not the master function has been stopped in the master device 101, and enables execution if the master function has been stopped. Meanwhile, the dual-role device 102 further includes the interrupt notifier 1023 that transmits an interrupt notification through an interrupt line to the master device 101. When the interrupt notifier 1023 has transmitted an interrupt notification to the master device 101, the controller 1020 stops the master function in the dual-role device 102. Consequently, transmission and reception of the master right between communication devices can be performed more reliably, and this avoids conflict of the master right and an abnormal state in which there is no master right in any communication device during master right transfer processing.

Also, in this embodiment, the dual-role device 102 transmits an interrupt notification to the master device 101 not only when the master right is resumed, but also when a time-out is detected. The interrupt notification from the dual-role device 102 to the master device 101 causes the controller 1010 of the master device 101 to check whether or not the master device 101 has the master right, and if it does not, the master right is resumed. Therefore, the master device 101 can maintain or resume its master function by means of interrupt notification not only when the master right is returned, but also when there is an error because the master right was not transferred for some reason, and an abnormal state in which no communication device has the master right can be prevented more reliably.

Embodiment 2

2-1. Configuration

Figure 12:
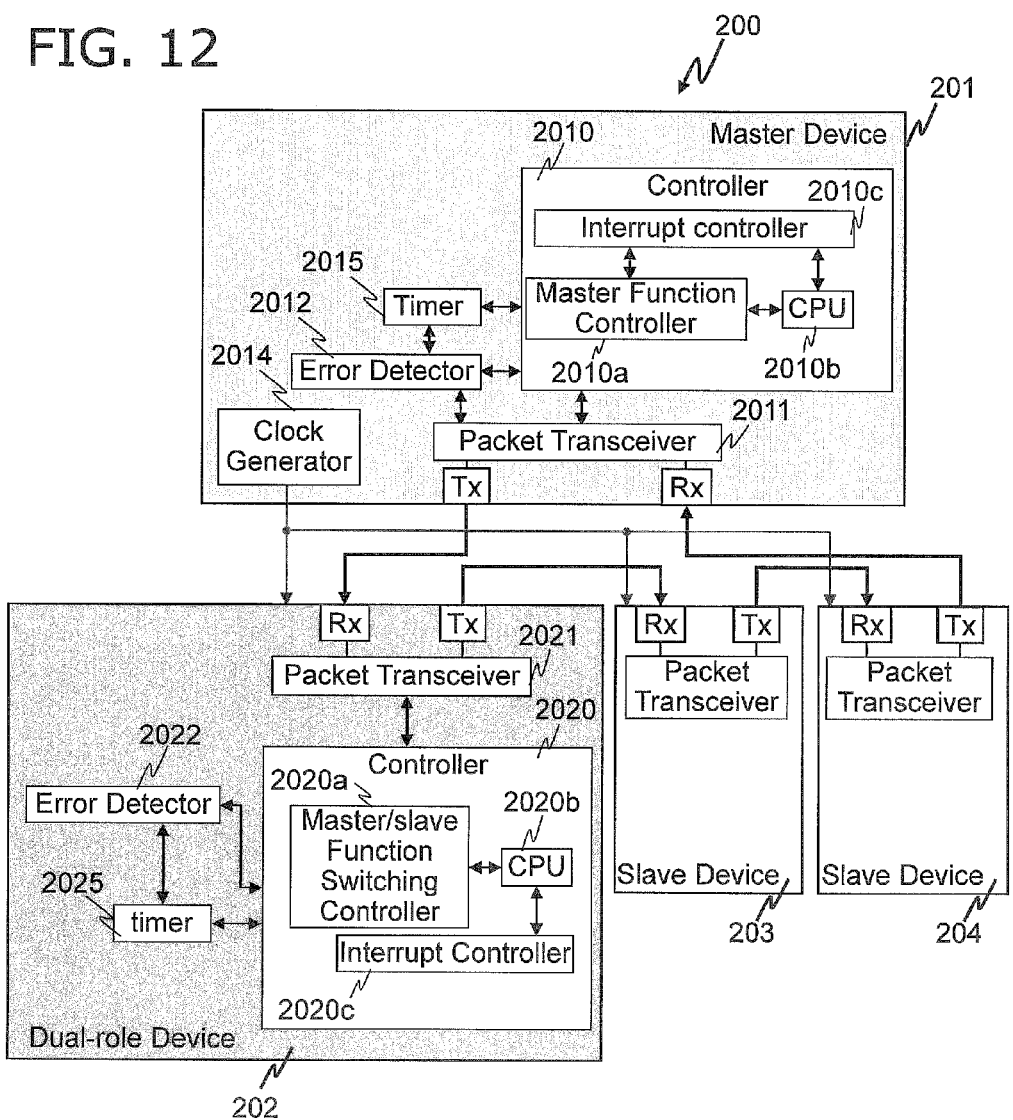
FIG. 12 is a simplified diagram of the functional configuration of a communication device in Embodiment 2.

FIG. 12 shows the communication system 200 pertaining to this embodiment, and is a simplified diagram of the functional configuration of a master device 201 (an example of a master device or a first master device), a dual-role device 202 (an example of a first communication device or a second master device), and slave devices 203 and 204 (examples of a second communication device or a communication device). The communication system 200 in this embodiment differs from the communication system 100 in Embodiment 1 in that the master device 201 and the dual-role device 202 are not connected by an interrupt line. In the following description, those constituent components that are the same as in Embodiment 1 will not be described again.

2-1-1. Configuration of Master Device 201

The internal configuration of the master device 201 will be described through reference to the configuration diagram of FIG. 12. The master device 201 includes a controller 2010 (an example of a controller or a first controller), a packet transceiver 2011 (an example of a transceiver or a first transceiver), an error detector 2012, a clock generator 2014, and a timer 2015.

The controller 2010 controls the entire master device 201, such as packet transmission control, execution control during packet reception, and management of the system status during error detection and interrupt detection.

The packet transceiver 2011, the error detector 2012, the clock generator 2014, and the timer 2015 are the same as in Embodiment 1.

The controller 2010 includes a master function controller 2010a, a CPU 2010b, and an interrupt controller 2010c. The interrupt controller 2010c manages the transmission and reception of interrupt packets and interrupt confirmation packets. The master function controller 2010a and the CPU 2010b are the same as in Embodiment 1.

As mentioned above, the master device 201 in this embodiment differs from Embodiment 1 in that there is no interrupt detector, and the controller 2010 has the interrupt controller 2010c.

2-1-2. Configuration of Dual-Role Device 202

Next, the internal configuration of the dual-role device 202 will be described through reference to the configuration diagram of FIG. 12. The dual-role device 202 includes a controller 2020, a packet transceiver 2021, an error detector 2022, and a timer 2025.

The controller 2020 (an example of a controller or a second controller) controls the entire dual-role device 202, such as packet transmission control, execution control during packet reception, and management of the system status during error detection and interrupt notification.

The packet transceiver 2021 (an example of a transceiver or a second transceiver), the error detector 2022, and the timer 2025 are the same as in Embodiment 1.

The controller 2020 includes a master/slave function switching controller 2020a, a CPU 2020b, and an interrupt controller 2020c. The interrupt controller 2020c manages the transmission and reception of interrupt packets and interrupt confirmation packets. The master/slave function switching controller 2020a and the CPU 2020b are the same as in Embodiment 1.

As mentioned above, the dual-role device 202 in this embodiment differs from Embodiment 1 in that there is no interrupt notifier, and the controller 2020 has the interrupt controller 2020c.

2-2. Operation

Figure 13:
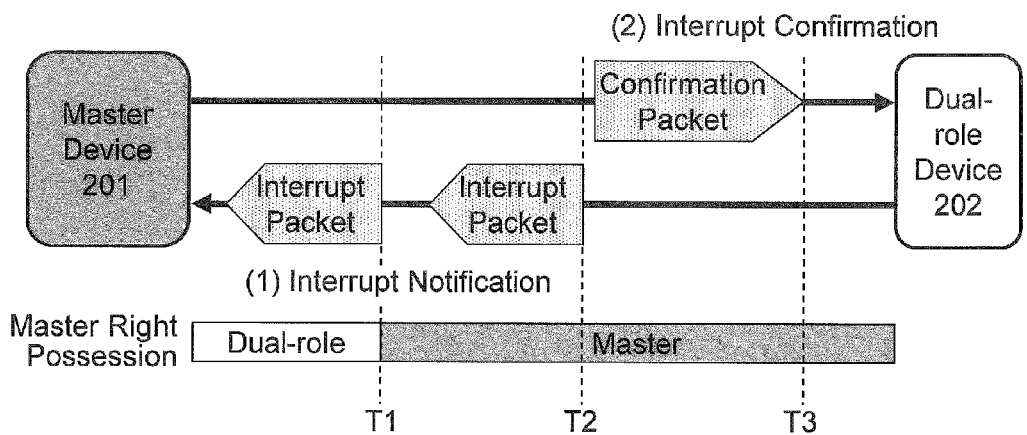
FIG. 13 is a sequence diagram of the processing when the data control is returned from the dual-role device to the master device in Embodiment 2.
Figure 14:
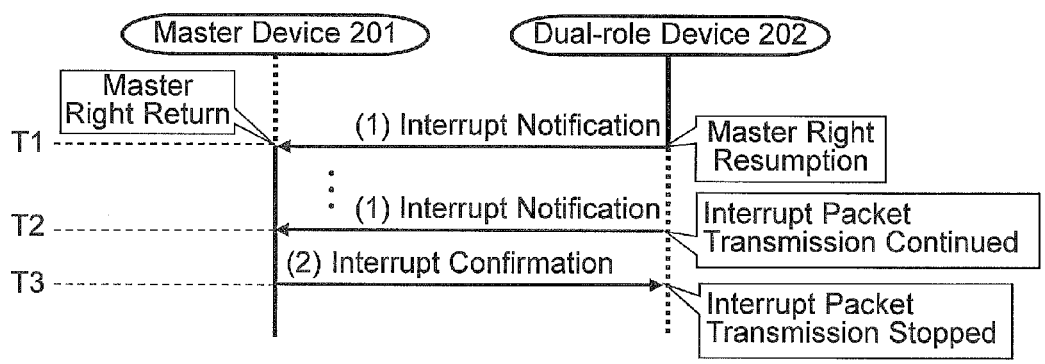
FIG. 14 is a sequence diagram of the processing when the data control is returned from the dual-role device to the master device in Embodiment 2.

FIG. 13 shows the sequence of packet data when the master right is returned between the master device 201 and the dual-role device 202. FIG. 14 shows the sequence of processing in which the master right is returned from the master device 201 to the dual-role device 202. The sequence of master right transfer is the same as in Embodiment 1, and therefore will not be described again.

As shown in FIGS. 13 and 14, during master right return, (1) the dual-role device 202 sends an interrupt packet (an example of a specific notification) to the master device 201. The dual-role device 202 also switches to a slave state and stops the master function when an interrupt packet is transmitted. Meanwhile, when an interrupt packet is received from the dual-role device 202, the master device 201 determines that the master right has been returned, and resumes its master function at T1 shown in FIGS. 13 and 14.

The dual-role device 202 repeatedly transmits interrupt packets until an interrupt confirmation packet is received from the master device 201 at T2 shown in FIGS. 13 and 14.

(2) The master device 201 transmits to the dual-role device 202 an interrupt confirmation packet in response to the interrupt packet. The dual-role device 202 stops interrupt packet transmission upon receiving the interrupt confirmation packet from the master device 201 at T3 shown in FIGS. 13 and 14.

Thus, an interrupt packet transmission serves as a trigger to return the master right from the dual-role device 202 to the master device 201.

Figure 15:
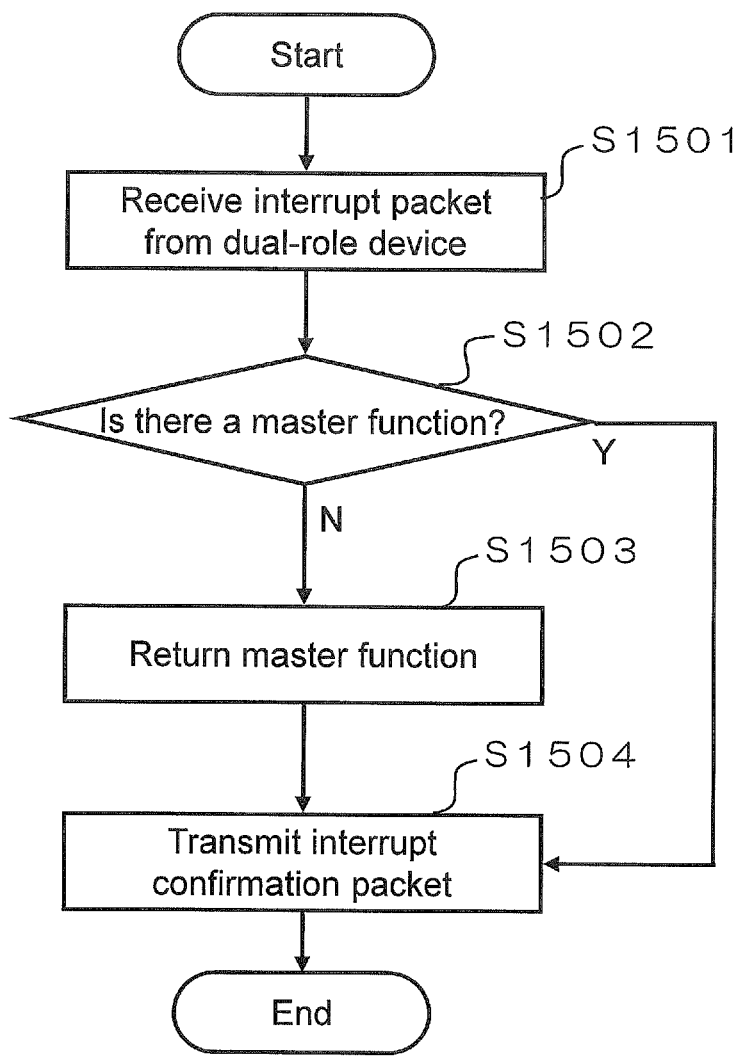
FIG. 15 is a flowchart of the processing performed by the master device for return of control in Embodiment 2.

The processing performed by the master device 201 in the master right return sequence will be described through reference to the configuration diagram in FIG. 12 and the flowchart in FIG. 15.

Step S1501: The packet transceiver 2011 notifies the controller 2010 when the receipt of an interrupt packet from the dual-role device 202 is detected.

Step S1502: The master function controller 2010a of the controller 2010 checks whether or not it has the master function itself. If it does not have the master function, the processing flow proceeds to step S1503, and if it does have the master function, the processing flow proceeds to step S1504.

Step S1503: The interrupt controller 2010c of the controller 2010 notifies the master function controller 2010a that an interrupt packet has been received. In response to this notification, the master function controller 2010a determines that the master right has been returned, and resumes its master function.

Step S1504: Finally, the interrupt controller 2010c sends a command to the packet transceiver 2011, and transmits an interrupt confirmation packet to the dual-role device 202. Subsequently, the master device 201 is able to issue commands to the other communication devices 202, 203, and 204.

Figure 16:
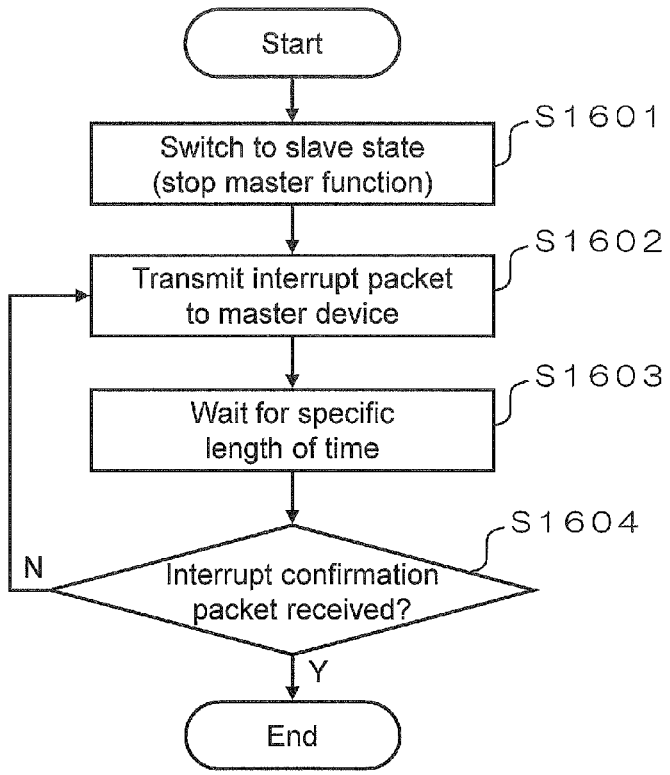
FIG. 16 is a flowchart of the processing performed by the dual-role device for return of data control in Embodiment 2.

The processing performed by the dual-role device 202 in the master right return sequence will be described through reference to the configuration diagram in FIG. 12 and the flowchart in FIG. 16.

Step S1601: During master right return, the master/slave function switching controller 2020a switches its own state to a slave state, and stops the master function.

Step S1602: The interrupt controller 2020c then sends a command to the packet transceiver 2021, and transmits an interrupt packet to the master device 201. Subsequently, the dual-role device 202 does not issue any commands to the slave devices 203 and 204.

Step S1603: When an interrupt packet is transmitted, the interrupt controller 2020c enters processing to wait for the receipt of an interrupt confirmation packet from the master device 201, and waits for a specific length of time.

Step S1604: After this specific length of time has elapsed, the interrupt controller 2020c checks whether or not an interrupt confirmation packet has been received from the packet transceiver 2021, and if an interrupt confirmation packet has not been received, the flow returns to step S1602, and if an interrupt confirmation packet has been received, the processing is ended.

2-3. Effects, Etc.

As discussed above, the master device 201 in this embodiment enables execution of the master function when it has been determined that an interrupt packet has been received from the dual-role device 202 while the controller 2010 has stopped the master function in the master device 201, and transmits to the dual-role device 202 through the packet transceiver 2011 an interrupt confirmation packet in response to the interrupt packet. The dual-role device 202 is such that the packet transceiver 2021 repeatedly transmits the interrupt packet through a communication line to the master device 201, and when the packet transceiver 2021 first transmits an interrupt packet, the controller 2020 stops the master function in the dual-role device 202.

Consequently, the return of the master right based on an interrupt packet is possible, and even though there is no interrupt line between the master device 201 and the dual-role device 202, transmission and reception of the master right between the communication devices can be performed more reliably, just as in Embodiment 1. Therefore, an abnormal state in which no communication device has the master right, or conflict of the master right, can be avoided during master right transfer processing.

Also, if the interrupt controller 2020c of the dual-role device 202 continues interrupt packet transmission processing until an interrupt confirmation packet is received from the master device 201, an abnormal state caused by the disappearance of an interrupt packet (a state in which neither the master device 201 nor the dual-role device 202 has the master right) can be avoided.

Others Embodiments

Embodiments 1 and 2 were described above as examples of the technology disclosed in this application, but the technology disclosed herein is not limited to this, and can also be applied to embodiments with modifications, substitutions, additions, omissions, and so forth made as needed. Also, the various constituent elements described in Embodiments 1 and 2 above can be combined to create new embodiments.

Figure 17:
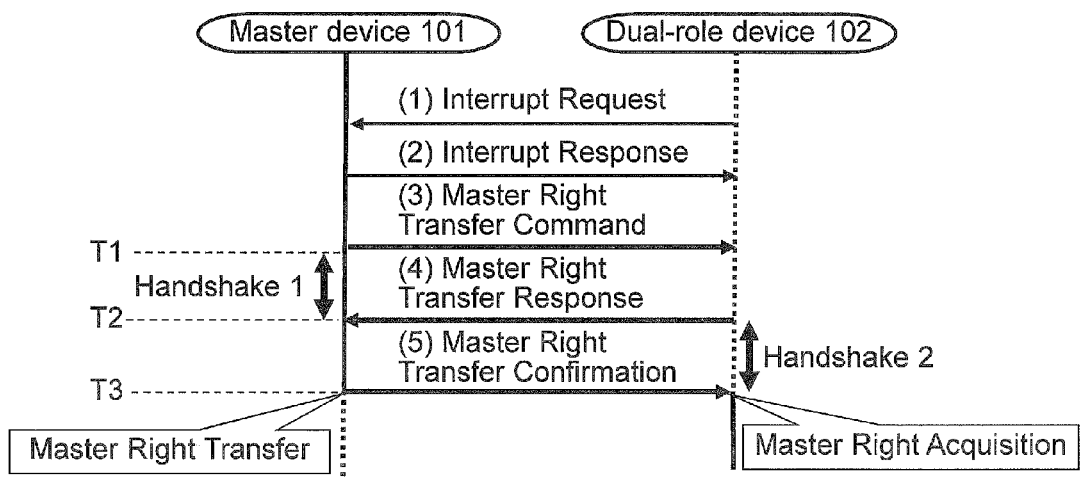
FIG. 17 is a processing sequence diagram when the data control is transferred from the master device to the dual-role device in another embodiment.

For example, in the above embodiments, it is also possible to request a master right transfer command of the master device from the dual-role device side. FIG. 17 shows the sequence in this case. Here, the apparatus in Embodiment 1 (FIG. 2) will be used as an example. (1) First, the dual-role device 102 sends the master device 101 an interrupt request (an example of a specific notification) via an interrupt line. (2) Then, the master device 101 transmits a response to the interrupt request to the dual-role device 102 through a communication line. At this point, at the master device 101, detection by the interrupt detector 1013 is sent to the controller 1010, and the master function controller 1010a transmits a master right transfer command through the packet transceiver 1011 at T1 shown in FIG. 17. Thereafter, just as in Embodiment 1, (3) the dual-role device 102 sends the master device 101a master right transfer response to the master right transfer command at T2 shown in FIG. 17. (4) When the master device 101 receives the master right transfer response, a handshake 1 is established. (5) When the handshake 1 is established, the master device 101 sends the dual-role device 102 a master right transfer confirmation at T3 shown in FIG. 17, and a handshake 2 is established. The processing for returning the master right is carried out as in Embodiment 1, by interrupt notification from the dual-role device 102 (FIGS. 8 and 9).

Other modifications are also possible without departing from the gist of the present invention.

For example, a packet was used as the data unit in the above embodiments, but this is not the only option. The present invention can also be applied to the data units corresponding to whatever protocol is used.

Also, with a master device or a dual-role device, the various blocks may be made into individual chips by using an LSI or other such semiconductor device, or may be made into a chip that includes some or all of them.

The term LSI was used here, but depending on the degree of integration, this is also sometimes referred to as an IC, system LSI, super LSI, or ultra LSI.

The method for circuit integration is not limited to LSI, and may instead be accomplished by a dedicated circuit or a multipurpose processor. A reconfigurable processor, which allows reconfiguration of settings and connections of circuit cells within the LSI, or an FPGA (field programmable gate array) that allows programming after LSI manufacture, may be used.

Furthermore, if some new technology for circuit integration should appear that replaces LSI either through advances in semiconductor technology or some other related technology, naturally that technology may be used to integrate the functional blocks. The application of biotechnology or the like is also a possibility.

Also, some or all of the processing of the functional blocks in the above embodiments may be realized by a program. And some or all of the processing of the functional blocks in the above embodiments may be performed in a computer by a processor or a CPU. Also, the programs for performing the various processing may be stored on a hard disk, a ROM, or another such memory device, and read out and executed from the ROM or a RAM.

Also, the various processing in the above embodiments may be realized by hardware, or by software (including an OS (operating system), middle ware, or a specific library). Furthermore, processing involving a mixture of software and hardware may be used. When the communication system, master device, dual-role device, and slave devices pertaining to the above embodiments are realized by hardware, it should go without saying that the timing at which the various processing is performed will need to be adjusted. In the above embodiments, the adjustment of timing of the various signals produced by actual hardware design was not discussed in detail for the sake of brevity.

Also, the order in which the processing was executed in the above embodiments is not necessarily limited to what was given in the above embodiments, and the execution order can be switched around without departing from the gist of the invention.

The scope of the present invention encompasses a computer program that allows the above-mentioned method to be executed by a computer, and a computer-readable recording medium on which this program is recorded. Examples of the computer-readable recording medium referred to here include flexible disks, hard disks, CD-ROMs, MO disks, DVDs, DVD-ROMs, DVD-RAMs, BDs (Blu-ray Discs), and semiconductor memories.

The above-mentioned computer program is not limited to one that is recorded to the above-mentioned recording medium, and may instead be one that is transmitted over a network, such as the Internet, or by an electrical communication line or a wired or wireless communication line.

The master device and the dual-role device in the above embodiments are not limited to being separate devices, and may instead be constituted within a single device.

The specific configuration of the present invention is not limited to or by the above embodiments, and various modifications and improvements are possible without departing from the gist of the invention.

This disclosure can be utilized in communication technology in which a plurality of communication devices are connected by communication lines, and control data is exchanged.

What is claimed:

1. A second master device configured to be connected to at least one communication device and a first master device, the at least one communication device being configured to store data, and the first master device being configured to manage a data control that enables execution of controlling the data, said second master device comprising:
    a transceiver configured to receive a transfer command to transfer the data control from the first master device via a first communication line, and transmit to the first master device a response to the transfer command;
    a controller configured to produce the response to the transfer command and either stop or enable the execution of controlling the data; and
    notification circuitry configured to send a specific notification to the first master device via a second communication line that is different from the first communication line,
    wherein the controller is further configured to enable the execution of controlling the data when having received a confirmation notification for the response from the first master device via the transceiver,
    wherein the controller stops the execution of controlling the data when the notification circuitry has sent the specific notification to the first master device, and
    wherein the controller produces the specific notification and the notification circuitry transmits the produced specific notification via the second communication line to the first master device when the transceiver does not receive a confirmation notification for the response to the transfer command from the first master device for a specific length of time after the transceiver has transmitted the response to the transfer command to the first master device.

2. The second master device according to claim 1, wherein the controller produces the specific notification and the notification component sends the produced specific notification to the first master device, thereby requesting the first master device to transmit the transfer command to transfer the data control.

3. A communication system, comprising:
    one or more communication devices configured to store data;
    a first master device connected to the one or more communication devices, the first master device being configured to manage a data control that enables execution of controlling the data stored in the one or more communication devices; and
    a second master device connected to the first master device and the one or more communication devices,
    wherein the first master device includes:
        a first transceiver configured to transmit through a first communication line to the second master device a transfer command to transfer the data control, and receive from the second master device a response to the transfer command; and
        a first controller configured to produce the transfer command and stop or enable the execution of controlling the data, wherein the second master device includes:
   a second transceiver configured to receive the transfer command from the first master device through the first communication line, and transmit the response to the first master device; and
   a second controller configured to produce the response and stop or enable the execution of controlling the data,
wherein the first controller is further configured to (i) produce a confirmation notification for the response and (ii) stop the execution of controlling the data when having transmitted the confirmation notification to the second master device through the first transceiver,
wherein the second controller is further configured to enable the execution of controlling the data when having received the confirmation notification from the first master device through the second transceiver,
wherein the second master device is further connected to the first master device via a second communication line that is different from the first communication line, and
wherein the second master device connects with the first master device via the second communication line (i) when the data control is returned to the first master device, (ii) when an error has occurred in communication with the first master device, or (iii) when a request for a transfer of the data control is sent to the first master device.

4. The communication system according to claim 3, wherein the first master devices includes a detector configured to detect a receipt of a specific notification through the second communication line, and
wherein the first controller enables the execution of controlling the data when the detector detects the receipt of the specific notification.

5. The communication system according to claim 3, wherein, when the first controller determines that a specific notification has been received from the second master device through the first communication line, the first controller enables the execution of controlling the data, and transmits a response to the specific notification to the second master device through the first transceiver.

6. The communication system according to claim 3, wherein the first master device includes a detector configured to detect a receipt of a specific notification through the second communication line, and
wherein, when the detector detects the receipt of the specific notification, the first controller produces a response to the specific notification, then transmits the response to the specific notification to the second master device through the second communication line, and transmits the transfer command to transfer the data control to the second master device through the first communication line.

7. A communication method using one or more communication devices, a first master device, and a second master device, the first master device being configured to manage a data control that enables execution of controlling data stored at least in the one or more communication devices, the second master device being connected to the first master device and the one or more communication devices, said method comprising:
   transmitting a transfer command to transfer the data control from the first master device to the second master device through a first communication line;
   transmitting a response to the transfer command from the second master device to the first master device through the first communication line;
   transmitting a confirmation notification for the response from the first master device to the second master device through the first communication line;
   stopping the execution of controlling the data when the first master device has transmitted the confirmation notification;
   enabling the execution of controlling the data when the second master device has received the confirmation notification; and
   connecting the first master device with the second master device through a second communication line different from the first communication line (i) when the data control is returned to the first master device, (ii) when an error has occurred in communication with the first master device, or (iii) when a request for a transfer of the data control is sent to the first master device.

* * * * *